(12) United States Patent
Hachenberger et al.

(10) Patent No.: US 6,834,198 B1
(45) Date of Patent: Dec. 21, 2004

(54) METHOD AND DEVICE FOR CELLULAR BASE STATION ANTENNA OPTIMIZATION

(75) Inventors: Andreas Hachenberger, Weixdorf (DE); Klaus Jäckel, Berlin (DE); Mathias Reibe, Dessau (DE); Reinhard Schiffel, Schönwalde (DE); Joachim Seidel, Berlin (DE)

(73) Assignee: Q-Cell GmbH, Jena (DE)

( * ) Notice: Subject to any disclaimer, the term of this patent is extended or adjusted under 35 U.S.C. 154(b) by 0 days.

(21) Appl. No.: 09/719,123

(22) PCT Filed: Jun. 1, 1999

(86) PCT No.: PCT/EP99/03774

§ 371 (c)(1),
(2), (4) Date: Feb. 7, 2001

(87) PCT Pub. No.: WO99/65159

PCT Pub. Date: Dec. 16, 1999

(30) Foreign Application Priority Data

Jun. 8, 1998 (DE) .......................... 198 25 536

(51) Int. Cl.[7] .............................. H04Q 7/38; H04Q 7/30
(52) U.S. Cl. ...................... 455/562.1; 455/450; 375/148
(58) Field of Search ............................ 455/562.1, 561, 455/450, 452.2; 375/148, 130, 144

(56) References Cited

U.S. PATENT DOCUMENTS

| | | | | |
|---|---|---|---|---|
| 5,434,578 A | * | 7/1995 | Stehlik | 342/383 |
| 5,479,397 A | | 12/1995 | Lee | 370/18 |
| 5,515,378 A | | 5/1996 | Roy, III et al. | 370/95.1 |
| 6,094,165 A | * | 7/2000 | Smith | 342/373 |
| 6,104,930 A | * | 8/2000 | Ward et al. | 455/450 |
| 6,104,935 A | * | 8/2000 | Smith et al. | 455/562.1 |
| 6,108,565 A | * | 8/2000 | Scherzer | 455/562.1 |
| 6,407,993 B1 | * | 6/2002 | Moulsley | 370/347 |
| 6,519,477 B1 | * | 2/2003 | Baier et al. | 455/67.11 |

FOREIGN PATENT DOCUMENTS

| | | | | |
|---|---|---|---|---|
| EP | 352 787 | 1/1990 | | H04B/7/08 |
| EP | 454 368 | 10/1991 | | H04B/7/08 |
| EP | 668 668 | 8/1995 | | H04B/7/26 |
| WO | WO 95/03652 | 2/1995 | | H04B/7/26 |
| WO | WO 95/22210 | 8/1995 | | H04B/7/26 |
| WO | WO 96/08908 | 3/1996 | | G01S/3/02 |
| WO | WO 97/23063 | 6/1997 | | H04B/7/08 |

* cited by examiner

*Primary Examiner*—Edward F. Urban
*Assistant Examiner*—Blane J. Jackson
(74) *Attorney, Agent, or Firm*—Cohen, Pontani, Lieberman & Pavane

(57) ABSTRACT

A device for a full-duplex-capable radio transmission system with DS-CDMA access, including a central radio base station, and a plurality of subscriber stations which are independent of one another and which are each designed with at least one transmission and reception antenna, the radio base station having a reception antenna divided in its horizontal antenna characteristic into a plurality of reception segments, and an evaluation unit connected to the reception segments and operative to determine which of the reception segments has the best reception quality on a subscriber-specific basis and to select the determined reception segment for further data processing, the radio base station further including a transmission antenna having a segmented antenna characteristic.

8 Claims, 5 Drawing Sheets

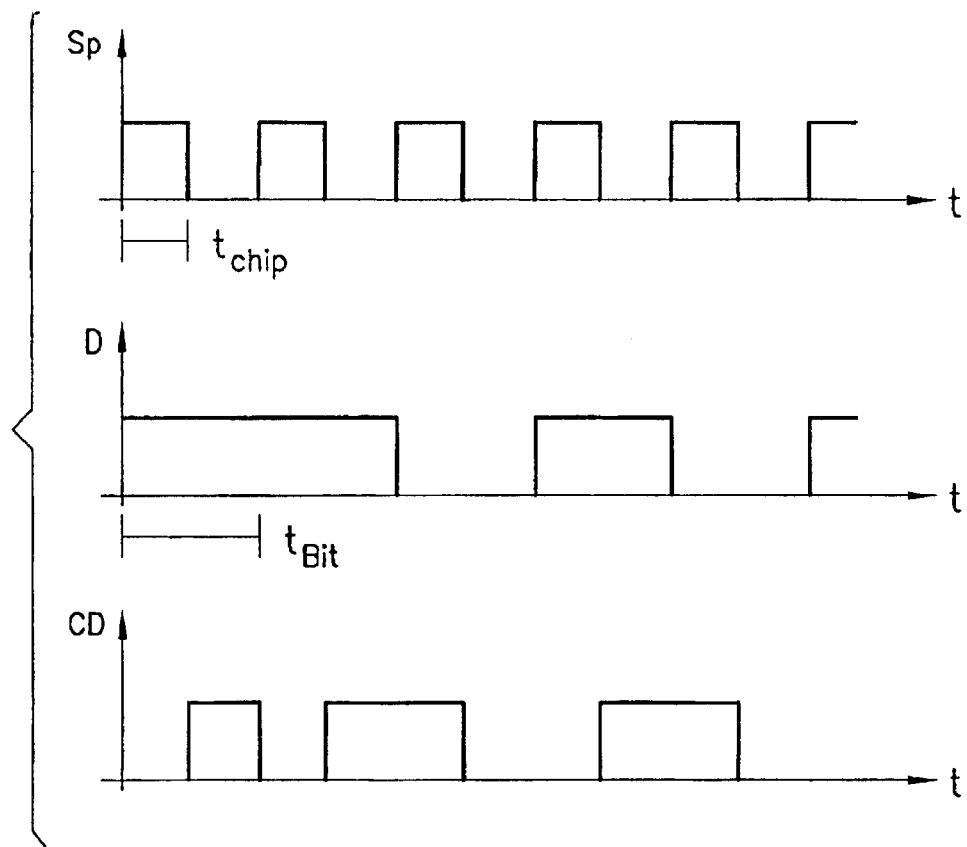
FIG.3
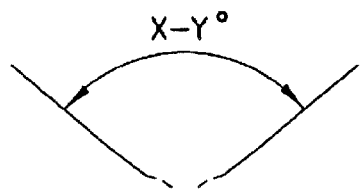
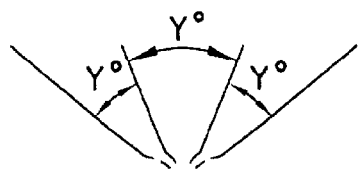
FIG.4A        FIG.4B

METHOD AND DEVICE FOR CELLULAR BASE STATION ANTENNA OPTIMIZATION

PRIORITY CLAIM

This is a U.S. national stage of application No. PCT/EP99/03774, filed on Jun. 1, 1999. Priority is claimed on that application and on the following application:

Country: Germany, Application No.: 198 25 536.5, Filed: Jun. 8, 1998.

BACKGROUND OF THE INVENTION

1. Field of the Invention

The invention relates to a method and a device for a full-duplex-capable radio transmission system with DS-CDMA access, having a central radio base station and a plurality of subscriber stations which are independent of one another.

2. Discussion of the Prior Art

In the field of radio-supported information systems which operate with a central radio base station and a plurality of external stations or subscriber stations which are independent of one another and which permit information to be transmitted in full duplex form in both directions, the information in the downlink which is intended for the individual users is frequently multiplexed into a telecommunications channel and transmitted organized as an access system in the uplink. Examples of such systems are mobile radio systems, public trunked mobile radio systems, point-to-multipoint microwave radio systems and wireless local loop systems. Orthogonal signal domains which differ from one another are used in each case for the multiplexing or multiple access, these signal domains being, for example,

- frequency division multiplex or access systems FDMA (frequency division multiple access)
- time division multiplex or access system TDMA (time division multiple access)
- code division multiplex or access systems CDMA (code division multiple access) or SSMA (spread spectrum multiple access), and
- space division multiplex or access systems.

The systems differ in that the transmission of information from and to the individual users takes place in separate frequency, time, code or spatial segment positions. Interleaved, coupled or respectively different multiplex and access technologies within one system, so-called hybrid methods, have also become known. Depending on the use and implementation, different transmission parameters and transmission quality criteria can be obtained with these methods.

In CDMA systems, the user signal is coded by gating it with a spread function using logic operations, a separate spread function which is orthogonal to the other spread functions being selected for each subscriber station. The logic operation is carried out here in each case by means of an X-OR gate, for example. At the receiver end, the coded signal can be demodulated through knowledge of the associated spread function, the coded user data for other subscriber stations becoming zero during the demodulation process owing to the orthogonality. It is particularly advantageous with CDMA systems that all the users can operate in the same frequency band and a relatively high degree of interference power in the band can be tolerated. Furthermore, under certain conditions it is possible that adjacent radio cells can operate on the same frequency band. It is generally a disadvantage that the multi-user interference, which arises in practice as a result of implementation problems such as band limitation, level differences between the individual transmissions, multi-path propagation etc. and which leads to a loss of orthogonality. In the radio systems under consideration, it is to be noted basically that because of the different signal transit times owing to different distances between the external stations and the central station an asynchronous reception situation is normally produced in the base station receiver, which situation considerably aggravates this interference to such an extent that under ideal conditions code orthogonality is then no longer produced in the uplink. In this case, the maximum number of simultaneous transmissions M within a frequency band in the uplink of, by approximation, a DS-CDMA system can be estimated as follows:

$$M=PG/(E_b/N_o),$$

PG being the process gain or spread factor and $E_b/N_o$ being the ratio of bit energy to interference power, necessary for the aimed-at bit error rate, at the demodulator. The spread factor is the ratio of $t_{bit}$ to $t_{chip}$ and is typically between $10^1$ and $10^4$.

Assuming the ratio $E_b/N_0$ is, for example, 3, which corresponds to approximately 5 dB, in terms of the same bandwidth being seized, only approximately ⅓ of the transmission capacity is available in the uplink in comparison with the downlink or in comparison with TDMA or FDMA systems if orthogonal signals are assumed for the latter.

Various methods are known which reduce the previously described disadvantage of the asynchronous CDMA methods, for example the synchronization of the external station in such a way that its transmission can be processed chip-synchronously in the receiver of the base station. In addition, it has been proposed to implement interference cancelers which, by means of mathematical algorithms, subsequently eliminate the interference component of the parallel transmissions on the basis of different a priori or a posteriori knowledge. Furthermore, it has also been proposed to use multi-user detectors. A disadvantage of all these known methods is that they are very costly to implement.

SUMMARY OF THE INVENTION

The invention is therefore based on the technical problem of providing a method and a device for a full-duplex-capable radio transmission system with DS-CDMA access, in which the ratio of uplink transmission capacity with respect to downlink transmission capacity is improved.

Pursuant to this object, and others which will become apparent hereafter, one aspect of the present invention resides in dividing the reception antenna in its horizontal antenna characteristic into a plurality of reception segments which are each connected to an evaluation unit by means of which the reception segment with the best reception quality can be determined on a subscriber-specific basis and can be selected for the rest of the data processing. In this way the influence of interference of other, simultaneously transmitting subscriber stations is considerably reduced, since it is possible to assume that all the subscribers are separated from one another with approximately uniform spatial distribution in the region of influence of the base station reception antenna segments, and there is also no marked correlation between the subscriber location and parallel transmission. Consequently, the quality of the separation of the individual reception signals depends essentially on what transfer occurs as a result of the specific characteristic of the antennas, what interference occurs in the regions of the other respective antenna apertures as a result of multipath propagation and how many subscribers are transmitting simultaneously, considered statistically and instantaneously, in the spatial segment of an antenna.

BRIEF DESCRIPTION OF THE DRAWING

The invention is explained in more detail below with reference to a preferred embodiment.

FIG. 3 shows a signal profile for a spread function, a user signal and an encoded signal, FIG. 4 shows a subdivision of the horizontal antenna characteristic.

DETAILED DESCRIPTION OF THE PREFERRED EMBODIMENT

Figure 1:
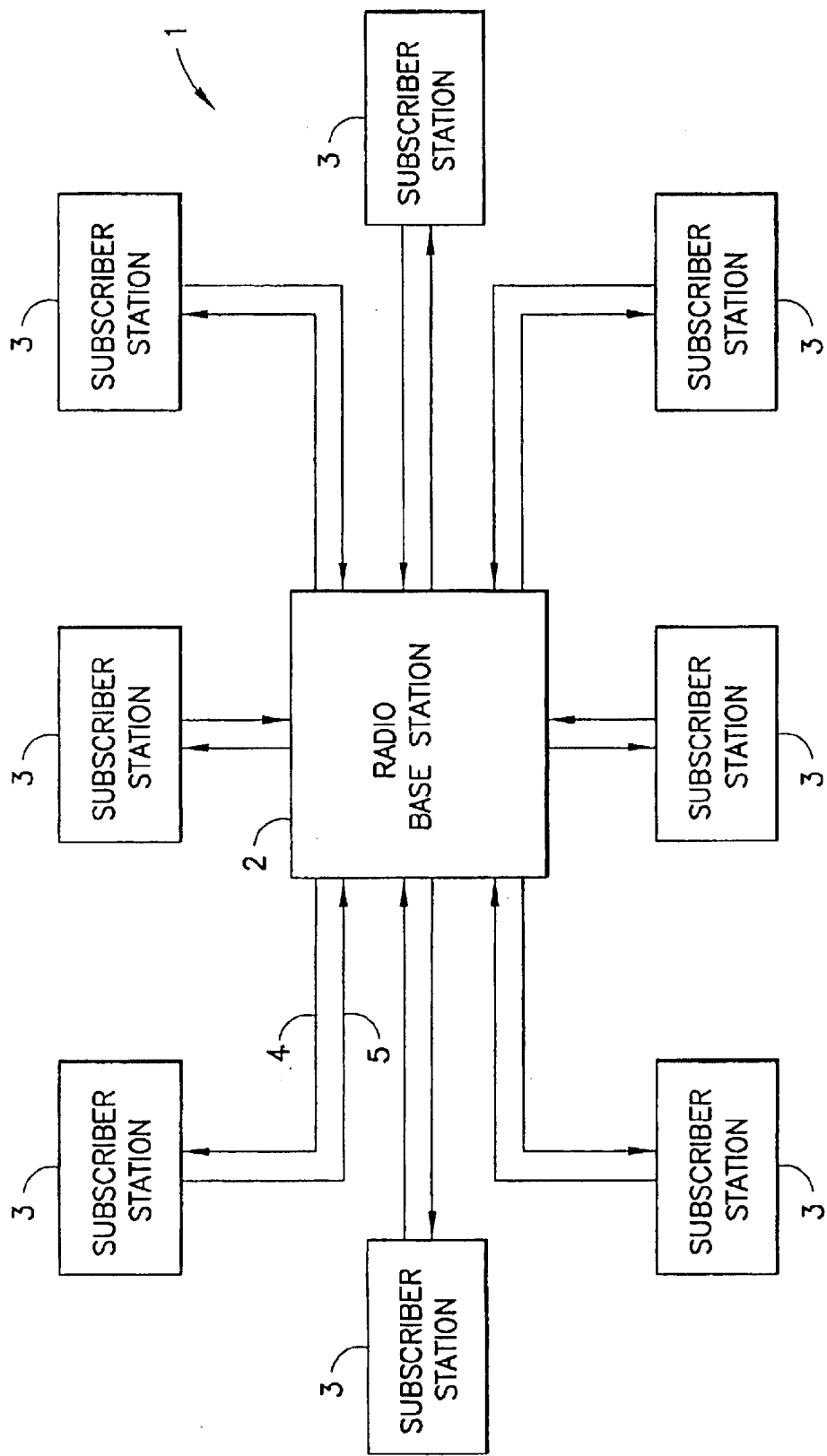
FIG. 1 shows a schematic block circuit diagram of a radio system having a central radio base station (prior art)
Figure 2:
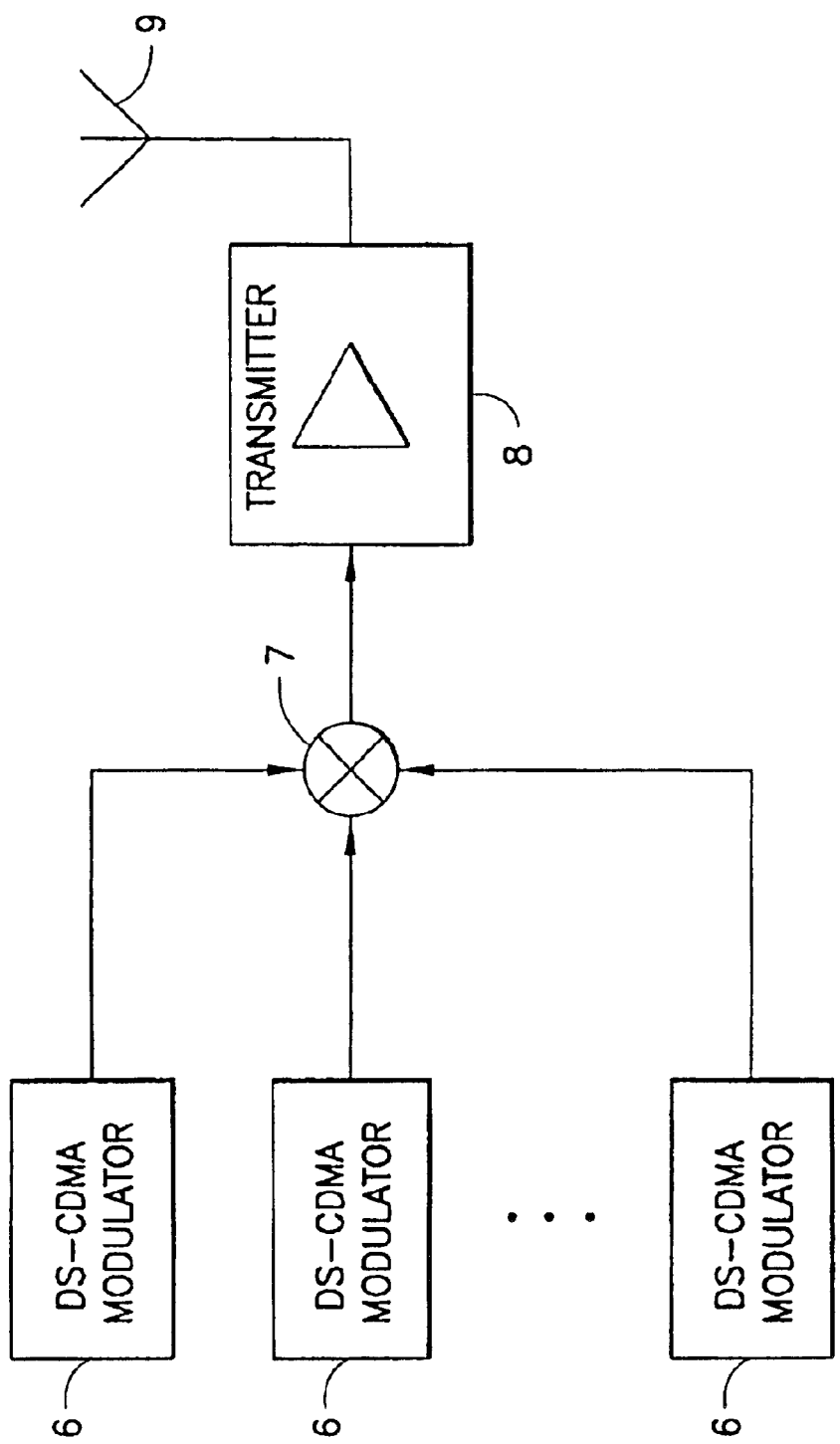
FIG. 2 shows a block circuit diagram of the radio base station for the transmission mode.

FIG. 1 is a schematic illustration of the radio system 1 which comprises a central radio base station 2 and a plurality of independent subscriber stations 3. The radio system 1 is of full-duplex design, i.e. each subscriber station 3 can transmit and receive user data, as can the radio base station 2. In this context, the transmission direction 4 from the radio base station 2 to a subscriber station 3 is designated as downlink, and the transmission direction 5 from the subscriber stations 3 to the radio base station 2 is designated as uplink. In the downlink, the user data for each subscriber station 3 must be specially coded so that the subscriber station 3 can detect and pass on the data intended for it. The coding is carried out in DS-CDMA modulators 6, each subscriber station 3 being assigned at least one DS-CDMA modulator 6 in the radio base station 2. The signals which are coded in this way are fed to a summation element 7 and broadcast via a transmitter 8 with associated transmission antenna 9.

FIG. 3 illustrates by way of example a spread function Sp which in the example illustrated is a pulse sequence with half the period length $t_{chip}$. The actual user signal D with the half period length $t_{bit}$ is gated with the spread function Sp with a logic operation so that a coded user signal CD is produced. It can be seen that the coded user signal CD represents the output signal of an X-OR gate with the two input variables Sp and D.

In FIG. 4a, the horizontal antenna characteristic of the transmission antenna 9 with an aperture $X \cdot Y^\circ$ is illustrated by way of example, X being the ratio of the downlink transmission capacity with respect to the uplink transmission capacity. Overall, the reception antenna of the radio base station 2 must have the same aperture $X \cdot Y^\circ$, but the latter is segmented or partitioned with the ratio X, which is illustrated graphically for X=3 in FIG. 4b.

Figure 5:
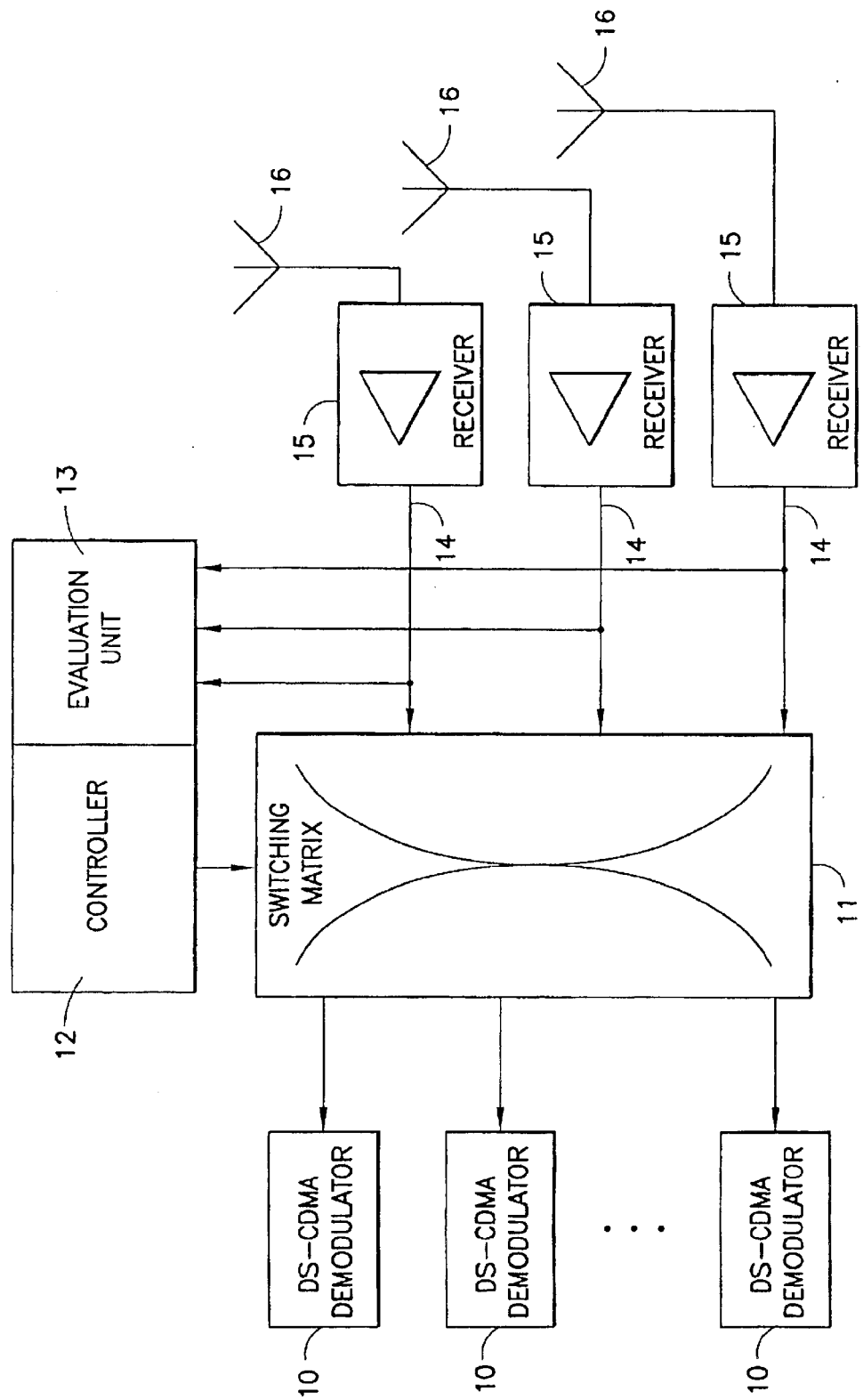
FIG. 5 shows a block circuit diagram of the radio base in the reception mode.

FIG. 5 illustrates the reception branch of the radio base station 2. Said branch comprises DS-CDMA demodulators 10, a switching matrix 11, a controller 12, an evaluation unit 13, a digital reception bus 14, a receiver 15 and reception antennas 16. The reception antennas 16 together have the same horizontal antenna characteristic as the transmission antenna 9. Given three reception antennas 16, each reception antenna 16 has, for example, an aperture of 12020 so that the radio base station 2 is completely covered horizontally. Each reception antenna 16 is connected to a receiver 15. Each receiver 15 comprises an input amplifier, a downconverter and a digitizer. At the output end, each receiver 15 is connected to the evaluation unit 13 and to the switching matrix 11 via the digital bus 14. The switching matrix 11 is controlled by means of the controller 12 and is connected at the output end to the DS-CDMA demodulators 10. The number of DS-CDMA demodulators 10 corresponds here to the number of simultaneously active subscriber stations 3. In the uplink mode, each reception antenna 16 then receives signals from subscriber stations 3 which broadcast within its reception characteristic, it being possible for signals to be received from a subscriber station 3 by a plurality of reception antennas 16. These signals which are conditioned by the receivers 15 are then fed to the evaluation unit 13. The evaluation unit 13 then determines successively for each individual subscriber station 3 the reception antenna 16 with which the signal from the subscriber station 3 was received best. The results are then transferred from the evaluation unit 13 to the controller 12 which then actuates the switching matrix 11 in accordance with the results so that each DS-CSMA demodulator 10 is assigned the reception antenna 16 which is best for it.

Since no user data must be lost as a result of the selection of the best reception branch, the reception can be started in parallel until the selection has been made. However, the selection is preferably already made before the reception of the actual user data. For this purpose, before the start of the transmission of user data, each subscriber station 3 transmits a significant test frequency which can then be evaluated.

Figure 6:
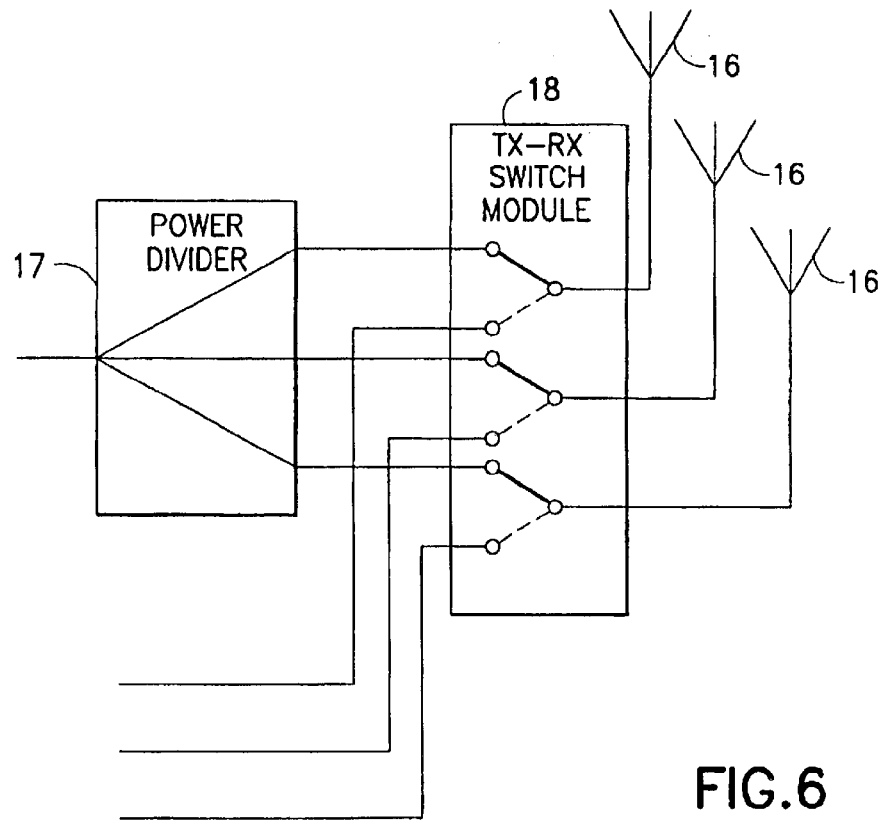
FIG. 6 shows a block circuit diagram for a common transmission/reception antenna of the radio base station and FIGS. 7a–b show signal profiles with test sequences.

The division of the reception characteristic on a segment basis can be implemented by means of various measures. Firstly, separate transmission and reception antennas may be used, the reception antennas then being designed as x-separate antennas. FIG. 6 illustrates an embodiment with x-separate antennas 16 which are also simultaneously used as transmission antennas. In this embodiment, all the x antennas 16 are operated in parallel in the transmission mode, the uniformly distributed supply of power being ensured by means of a power divider 17. The switch-over between transmission mode and reception mode is carried out here by means of a TX-RX switch module 18 which is arranged between the power carrier 17 and the reception antenna 16. In the example illustrated, the TX-RX switch module 18 is set to transmission mode, i.e. the reception antennas 16 are connected to the outputs of the power dividers. The state which is illustrated by broken lines corresponds to the reception mode in which the reception antennas 16 are connected to the receivers 15 (not illustrated here). Furthermore, beam-controlled antennas or smart antennas can also be used. It is possible to change the radiation characteristic with these antennas. Here, the directional information is superimposed by means of a baseband weighting and suitable interconnection of the individual reception branches. As a result, it is ultimately possible to improve the technical complexity of the antennas while simultaneously increasing the variety and flexibility with which certain antenna patterns can be set.

As already stated, the evaluation of the reception quality is preferably realized by means of a test sequence before the actual transmission of user data. It is particularly convenient that the test sequence can be realized in a time-division duplex mode. Since the interference level with a large number of parallel transmissions may be too high to acquire reliable information on it, the delay time between transmission and reception is lengthened somewhat and used for a subscriber station 3 which is attempting to set up a link (incoming or outgoing) to initially transmit a test sequence. This test sequence is evaluated in all the x-reception branches, for example by means of a matched filter. By reference to the reception result, precisely that branch which has supplied the best results is selected for the reception. Depending on the number and traffic characteristics of the subscriber stations 3, suitable measures must be taken to avoid collisions as a result of parallel transmissions of the test frequency by different subscriber stations 3, or to minimize their effects. This can be achieved, for example, by polling methods and the transmission of subscriber-specific acknowledgments.

Figure 7A:
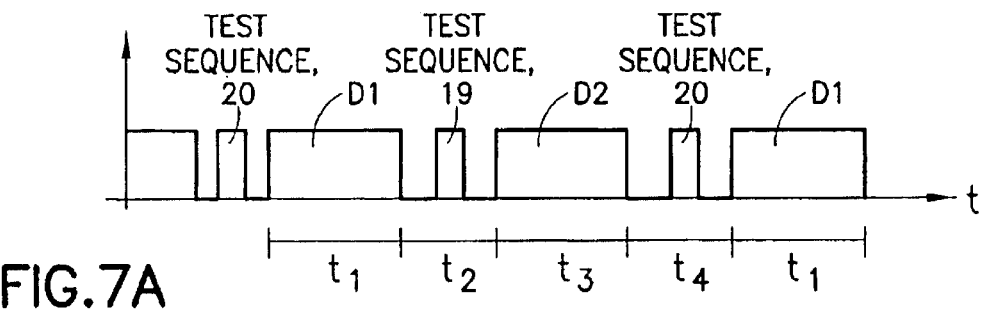
Figure 7B:
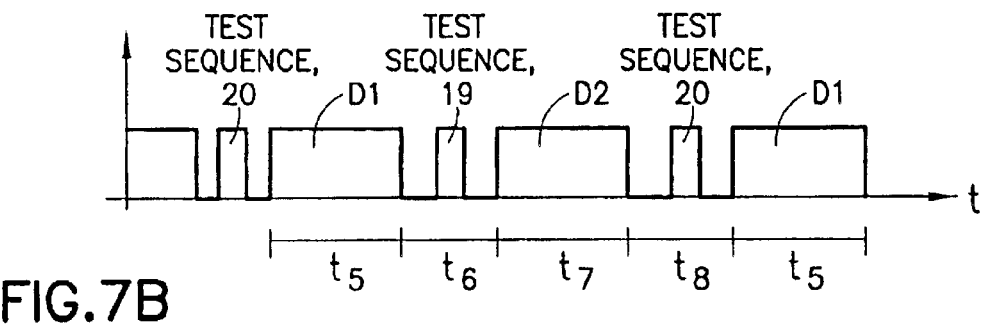

FIG. 7a illustrates such a cycle for the radio base station 2. In the time period $t_1$, the radio base station 2 receives data D1 from the subscriber stations 3. In the time period $t_2$, the delay time, a test sequence 19 is transmitted from the radio base station 2, one test sequence 19 which is significant for a specific subscriber station 3 or a group of subscriber stations 3 being preferably transmitted per cycle. Then, in the time period $t_3$, the transmission of user data D2 to the subscriber stations 3 takes place. In the subsequent delay time $t_4$, the radio base station 2 then receives a test sequence 20 from one subscriber station, or the subscriber stations 3, before the cycle begins again. In FIG. 7b, such a cycle is illustrated for a subscriber station 3. In the time period $t_5$, the subscriber station 3 transmits data D1 to the radio base station 2. In the delay time $t_6$, the test sequence 19 of the radio base station 2 is received and then subsequently, in the time period $t_7$, the user data D2 which are transmitted by the radio base station 2 are received. In the subsequent delay time $t_8$, the test sequence 20 is then transmitted to the radio base station 2, and data D1 are transmitted subsequent to that. The primary function of the test sequence 20 is to determine the best reception branch in the radio base station 2 for transmissions from a specific subscriber station 3. However, by means of the test sequences 19, 20 it is also possible to synchronize the subscriber stations 3 in order to compensate differences in transit time between the individual subscriber stations 3.

The method and the device can preferably be implemented in wireless local loop systems, since in these the stationary nature of the subscriber stations 3 and the existence of a service channel which controls the subscriber-dependent access to the radio channel are advantageously utilized.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

What is claimed is:

1. A device for a full-duplex-capable radio transmission system with DSCDMA access, comprising: a central radio base station; and a plurality of subscriber stations which are independent of one another and which are each designed with at least one transmission and reception antenna, the radio base station having a reception antenna divided in its horizontal antenna characteristic into a plurality of reception segments, and an evaluation unit connected to the reception segments, wherein said subscriber stations sequentially transmit respective subscriber-specific test signals from the subscriber stations to the radio base station in cycles prior to transmission of user data, said evaluation unit being operative to determine which of the reception segments has the best reception quality on a subscriber-specific basis based on said subscriber specific test signals and to select the determined reception segment for further data processing for each of said subscriber stations.

2. The device as defined in claim 1, wherein the horizontal antenna characteristic is divided with a ratio X of a downlink transmission capacity with respect to a ratio of an uplink transmission capacity.

3. The device as defined in claim 1, wherein a separate antenna is provided for each reception segment.

4. The device as defined in claim 1, wherein the reception antenna is a radiation-controlled antenna.

5. A method for transmitting data for a full-duplex-capable radio transmission system with DS-CDMA access by a device having a central radio base station, and a plurality of subscriber stations which are independent of one another and which are each designed with at least one transmission and reception antenna, the radio base station having a reception antenna divided in its horizontal antenna characteristic into a plurality of reception segments, and an evaluation unit connected to the reception segments and operative to determine which of the reception segments has the best reception quality on a subscriber-specific basis and to select the determined reception segment for further data processing the method comprising the steps of:

a) setting up a link via a service channel for all the reception segments of the radio base station in parallel;
   b) sequentially transmitting individual subscriber-specific test signals from the subscriber stations to the radio base station in cycles prior to transmission of user data;
   c) transferring the individual subscriber-specific test signals to the evaluation unit;
   d) making comparisons to determine in which of the reception segments the subscriber-specific test signals of a respective subscriber station are best received;

e) transferring the reception segment which is determined for the respective subscriber station to a controller of the radio base station; and f) selecting a best reception segment for the respective subscriber station by the controller so that only the reception segment selected on a subscriber-specific basis is used for data reception, and a complete unsegmented antenna characteristic of the radio base station is used for data reception at the radio base station.

6. A method, for transmitting data for a full-duplex-capable radio transmission system with DS-CDMA access by a device having a central radio base station, and a plurality of subscriber stations which are independent of one another and which are each designed with at least one transmission and reception antenna, the radio base station having a reception antenna divided in its horizontal antenna characteristic into a plurality of reception segments, and an evaluation unit connected to the reception segments and operative to determine which of the reception segments has the best reception quality on a subscriber-specific basis and to select the determined reception segment for further data processing, the radio base station further including a transmission antenna having a segmented antenna characteristic, the method comprising the steps of:

a) setting up a link via a service channel for all the reception segments of the radio base station in parallel;

b) transmitting individual subscriber-specific test signals from the subscriber stations to the radio base station prior to transmission of user data, the radio system is operated in time-division duplex mode, and the test signal is transmitted in a delay time between the transmission cycle and reception cycle of the actual telecommunications transmissions;

c) transferring received data to the evaluation unit;

d) making comparisons to determine in which of the reception segments data of a respective subscriber station are best received;

e) transferring the reception segment which is determined for the respective subscriber station to a controller of the radio base station; and f) selecting a best reception segment for the respective subscriber station by the controller so that only the reception segment selected on a subscriber-specific basis is used for data reception, and a complete unsegmented antenna characteristic of the radio base station is used for data transmission.

7. The method as defined in claim 6, wherein the radio base station transmits test sequences to the individual subscriber stations in the delay time.

8. The method as defined in claim 7, including sequentially transmitting the individual test sequences of or for the subscriber stations in cycles.

* * * * *